Figure 1:
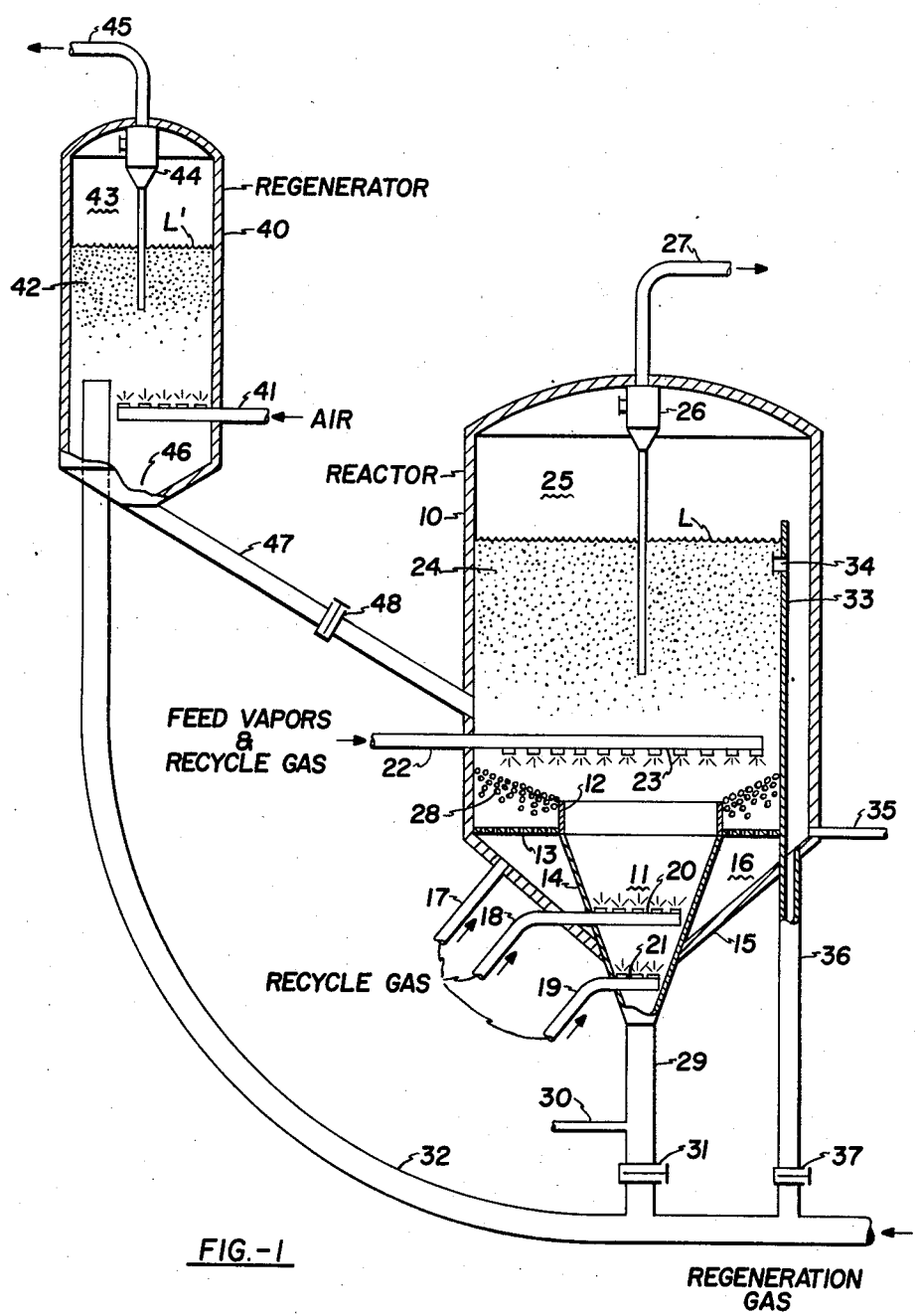

Sept. 22, 1959  D. D. MacLAREN ET AL  2,905,634
HYDROFORMING PROCESS
Filed Feb. 1, 1956  2 Sheets-Sheet 1

Donald D. MacLaren
Walter G. May          Inventors
Lawrence E. Swabb, Jr.

By H. M. Heyner  Attorney

Sept. 22, 1959   D. D. MacLAREN ET AL   2,905,634
HYDROFORMING PROCESS
Filed Feb. 1, 1956   2 Sheets-Sheet 2

Donald D. MacLaren
Walter G. May          Inventors
Lawrence E. Swabb, Jr.

By H. M. Heyner Attorney

2,905,634
HYDROFORMING PROCESS

Donald D. MacLaren, Scotch Plains, and Walter G. May, Union, N.J., and Lawrence Edward Swabb, Jr., Baton Rouge, La., assignors to Esso Research and Engineering Company, a corporation of Delaware Application February 1, 1956, Serial No. 562,854

4 Claims. (Cl. 208—149)

The present invention pertains to fluid catalytic processes and particularly to fluid catalytic processes in which inert heat transfer solids or shot of larger particle size and/or of greater density than the finely divided solid catalyst particles are circulated in the reaction system in order to facilitate the removal of heat from an exothermic reaction zone or the supply of heat to an endothermic reaction zone, or both.

The fluidized solids technique has been widely adopted for a variety of chemical reactions, especially for the conversion of hydrocarbons such as in catalytic cracking, reforming, hydroforming or the like, because of the advantages offered thereby of continuity of operation, uniformity of temperatures in the reaction and regeneration zones and the facility with which control of all phases of the process is achieved. An important advantage of the fluidized solids technique is the fact that the finely divided solid catalyst particles can be used to carry heat from the regeneration zone into the reaction zone.

It has been proposed to increase heat transfer in fluidized solids catalytic processes by circulating inert heat transfer solids through the system along with the catalyst particles. The use of this technique has been studied extensively in the laboratory and also in large pilot units, with special emphasis on its application to fluid hydroforming. This technique is especially useful in fluid hydroforming since selectivity considerations require that low catalyst to oil ratios, generally less than 3.5 to 1, be used. Such low catalyst-to-oil ratios seriously limit the amount of heat that can be transferred from the regeneration zone to the hydroforming reaction zone as sensible heat in the catalyst. Since the amount of heat released in the regenerator is greater than the catalyst can transport to the reactor at permissible temperatures, it is common practice to arrange cooling coils in the regenerator. This, therefore, makes it necessary to preheat the naphtha feed and recycle gas to such temperatures as tend to cause thermal degradation of the feed as well as of the higher molecular weight constituents of the recycle gas. By circulating inert heat transfer solids along with the catalyst, it is possible to eliminate the cooling coils in the regenerator, lower preheat temperatures and also reduce the amount of recycle gas circulated and still achieve a heat-balanced operation.

Certain difficulties in the application of this technique and, in particular, its application to fluid hydroforming have been encountered. These difficulties are discussed below. It is the purpose of this invention to provide the method and apparatus for using this heat transfer solids or "shot," in a manner to circumvent these difficulties.

One of the main requirements for successful application of the shot technique is the need for good gas distribution in order to permit the shot to settle out of the dense fluidized bed. This good gas distribution is especially critical at the start of a run or following an upset. Once a bed of shot has been formed, it will act as its own distributor; it is the formation of this bed which poses the difficulty. A suitable type of gas distributor is a horizontal pierced plate, a design which is conventional in fluidized solids operations. However, in the case of fluid hydroforming, such a distributor is impractical. To be successful, this type of distributor requires a large gas volume, usually in the form of a cone, below it. The holdup time of the gas flowing through this large cone results in excessive cracking of the hydroformer gas, with serious loss in yields and reduced operability. This loss, due to cracking, can be remedied by using a multiplicity of small cones. However, this greatly adds to the mechanical complexity of the unit. If it is desired to use a bed of shot as a distributor, a fairly deep bed must be employed. This deep bed of shot provides excessive holding times for the feed plus recycle gas resulting in high cracking losses. This obviously is to be avoided.

Another prime consideration in the use of shot is to minimize the pickup of shot from the shot layer in the reactor bottom with resulting backmixing into the dense catalyst bed. It has been found that when gas is passed through a bed of coarse shot, certain percentage is picked up by the turbulent mixing action of the dense catalyst bed, and is backmixed with the catalyst. Excessive pickup of this type results in a high percentage of shot in the dense catalyst bed. This obviously reduces the useful reactor volume. This is particularly critical in the case of hydroforming where relatively low space velocities are necessary, resulting in a large reactor even without dilution due to shot holdup. In fact, at the desired ratio of shot to catalyst in fluid hydroforming of three or higher, a completely mixed reactor would be impractical in size.

Still another important consideration is to provide means for varying the weight ratio of shot to catalyst in the circulating solid stream. This requires a reservoir of shot some place in the system. When a higher ratio of shot to catalyst is required, shot can be drawn from this reservoir. As will appear later, it has been found that in a fluid hydroformer, a swaged section (a cross-section smaller than the main vessel) is required at the bottom of the vessel. This swaged section can act as the necessary shot reservoir. It does have the disadvantage however, that it cannot provide for a very large change in shot inventory. This is due to two causes. First, the shot holdup is small because of the small cross section. Second, if the shot-catalyst interface is maintained in this zone, there is no sharp concentration gradient between the zone of pure shot and the zone of shot-catalyst mixture immediately above; this requires large changes in the level of the interface for small changes in shot inventory.

Still another difficulty encountered in fluid hydroforming is the requirement of high shot-catalyst ratios in the circulating stream. We have found it impossible to control shot-catalyst ratio in a combined stream operation if the shot-catalyst ratio exceeds about five. In hydroforming, it has been found that to obtain heat balance operation, it may be necessary to adjust the shot-catalyst ratios to as high as ten, and generally in the range of 3 to 10, depending on feedstock characteristics, etc.

It has also been found that there are narrow ranges of shot size which will permit easy separation of the shot from the dense catalyst bed, easy stripping of any entrained catalyst from the shot, and at the same time, permit transport of the shot from the reactor to the regenerator. The preferred shot size in fluid hydroforming in accordance with the present invention is about 1000 microns, although the shot actually used may have a size distribution covering the range of about 400–1400 microns.

One final problem accompanying the use of the relatively large size shot preferred in fluid hydroforming concerns the design of the regenerator. One alternative would be to run the regenerator at a velocity sufficiently high to maintain a completely mixed bed, the shot-catalyst mixture overflowing from this bed back to the reactor. This has the disadvantage with large shot of requiring very high velocities in the order of 2–2.5 ft./sec. to obtain complete mixing. This requires a specially designed regenerator to prevent excessive entrainment of catalyst. Another alternative, which is the preferred embodiment, is to use a bottom draw-off from the regenerator. Here the shot-catalyst mixture is withdrawn from the regenerator bottom and fed back to the reactor. With this system, normal gas velocities can be employed.

It is the object of this invention to provide the art with an improved method and apparatus for carrying out catalytic conversions by the fluidized solids technique employing inert heat transfer solids or shot to improve heat transfer.

It is also the object of this invention to provide an improved method and apparatus for concentrating heat transfer solids or shot in relatively large diameter units. It is a further object of this invention to provide a regenerator for shot-catalyst mixtures of improved design.

These and other objects will appear more clearly from the detailed specification and claims which follow.

In accordance with the present invention, inert, heat transfer solids or shot such as mullite, fused alumina, or the like or metal particle such as stainless steel or Monel are circulated with the finely divided catalyst particles in order to assist in the transfer of heat in the system. Because of the fact that the shot particles are of larger average particle size and are usually of higher density than the catalyst, they tend to settle through the dense fluidized beds of solids in the reactor and/or regenerator or heater vessels more rapidly than the catalyst particles.

By suitably choosing the gas velocity and shot size a settled layer of shot can be maintained below the fluid bed. To maintain a "clean" bed of shot, gas must be supplied to strip out catalyst as the shot settles. The amount of gas required with shot of the preferred size range, is large enough that it is a series handicap to the economic operation. It has been found that the volume of gas required can be reduced by having a zone at the bottom of the reactor of substantially smaller cross section than the main vessel. Shot settles into this conical or swaged down section. Besides conserving gas, this conical or swaged down section serves an additional useful purpose. As has been mentioned previously it is very important that extremely good gas distribution be provided. This can readily be done in a zone of reduced cross section, without at the same time requiring large gas hold-up volume. It has been found that it is possible to obtain the required gas distribution in this conical or swaged down section with practically no loss of desirable product due to thermal degradation. In contrast a considerable loss by cracking occurs in a unit which does not have such a zone of reduced section.

The weight ratio of shot to catalyst in the circulating solids stream is controlled principally by the control inventory of shot in the system. Accordingly, in order to obtain substantial control of the shot to catalyst ratio and to provide flexibility in the operation, it is essential to provide suitable means for storing a substantial inventory of shot so that shot may be added to or withdrawn from the reactor-regenerator circulating system. This swaged down section provides a shot storage reservoir. However, it has certain disadvantages. Because of the reduced cross section area it does not hold up much shot per unit height. An additional disadvantage appears if the interface between shot, and fluidized catalyst, is maintained in this section. In this event the concentration of shot in the fluidized catalyst is relatively higher than in the main vessel above. This is a consequence of the higher mass flow rate of shot (pounds of shot flowing per second per square foot of cross section) in the swaged section as compared with the main vessel. Because of this high shot concentration in the catalyst, any variation in the height of the shot-catalyst interface results in only a minor change in the amount of shot circulating in the remainder of the system, and as a result only a minor change in the shot catalyst ratio. Because of these disadvantages it is preferable to maintain the shot-catalyst interface above the section of smaller cross sectional area, i.e. up in the main vessel. When this is done, however, it has been found that the vigorous large scale mixing of the fluid catalyst in large commercial scale equipment picks up shot from the settled layer and mixes it back up into the main fluid bed. It has been found that baffles located a short distance above the shot-catalyst interface are very helpful in reducing this undesirable back mixing effect.

By controlling gas velocity in the lower portion of this settling zone it is possible to withdraw a stream of solids consisting essentially of pure shot or a mixture of shot and catalyst in the desired ratio. In the event that pure shot is withdrawn from the settling zone, provision is made to withdraw a stream of catalyst from another portion of the vessel, as by arranging a catalyst withdrawal line with its inlet near the upper part of the dense fluidized bed. By providing suitable slide valves or other flow control means on the shot and catalyst withdrawal lines, the rate at which these materials are withdrawn may be readily controlled so that they may be remixed in the desired proportions for transfer to the regeneration or heating zone.

The present invention is concerned primarily with the internal arrangements of the reactor vessel and particularly in the shot settling or concentrating zone. In accordance with the present invention, a portion of the recycle gas is supplied to an annular zone or section and thence through a static bed of shot or coarse solids which serves to distribute the incoming gas uniformly around the periphery of the settling zone. The remainder of the recycle gas is supplied to the active settling zone. The amount of gas supplied to this zone depends on the size of the shot.

It has been found that if the gas velocity is very low, shot settling through the settling or concentrating zone will carry a large amount of catalyst or fine particles along with it thus preventing the attainment of a clean shot stream. If the gas velocity is too high (i. e., sufficient to fluidize the shot) another difficulty is encountered, namely some of the shot which has settled out mixes back up into the catalyst bed. In this case, the shot concentration would have to be very high to get an appreciable net throughput of shot. This pickup and backmixing increases very rapidly with gas velocity, so that velocities much above the minimum fluidizing velocity of the shot become impractical. The gas velocity required will also depend on the ratio of shot size to catalyst size. If the shot is small, say less than 5–8 times the maximum catalyst particle size, then catalyst cannot flow freely through the voids in the shot bed. For a pure shot layer to settle out, gas velocity in the settling zone must be maintained at least at 75% of the minimum fluidizing velocity of the shot. The maximum velocity, as limited by pickup of shot, is about 95% of the minimum fluidizing velocity. This has been chosen at a point where the rate of shot pickup from the settled layer is about 0.5 lb. per second per sq. ft. If the shot is larger than 5 to 8 times the catalyst particle size, the spaces between the individual shot particles are large enough for the catalyst particles to move through without becoming trapped.

A clean separation of shot from catalyst, that is, with shot settling out containing no catalyst can then be obtained with a velocity which is less than 75% of the minimum fluidizing velocity. Gas velocities required for pure shot separation for various shot sizes, are illustrated by the experimental data below.

| Maximum Catalyst Particle Size, μ | 150 | 150 | 150 |
|---|---|---|---|
| Shot particle size, μ | 385 | 565 | 1100 |
| Minimum Shot fluidizing velocity, ft./sec. | 0.5 | 1.0 | 2.4 |
| Gas velocity needed for pure shot, ft./sec. | 0.4 | 0.8 | 0.9 |

It has been found that there is a preferred shot particle size for overall ease of operation. If the shot is too small, difficulty is encountered in getting it to settle readily from the main dense fluidized catalyst bed. On the other hand, if the shot is too large, difficulty is encountered in transporting it between the reactor and the regenerator. It has been found that shot smaller than 300–400 microns is very difficult to separate from the dense catalyst bed especially after an upset. It has also been found that shot larger than about 1500 microns requires excessive gas volume to transport it between the reactor and the regenerator. Specifically, it has been found that shot of an average particle size of 1000 microns is preferred. This is the smallest size which will give reproducible and reliable separation. This is an average particle size and the particles may vary in size from 400–1400 microns.

Of possibly greater importance than gas velocity is the distribution of gas to the fluid bed of shot and catalyst. Good gas distribution is extremely important in a region of high shot concentration in order that the shot may settle. With poor distribution the mixture boils violently carrying large amounts of shot back up into the main reactor bed. The present invention provides a most effective arrangement for achieving good gas distribution in the region of high shot concentration.

Figures 2, 3:
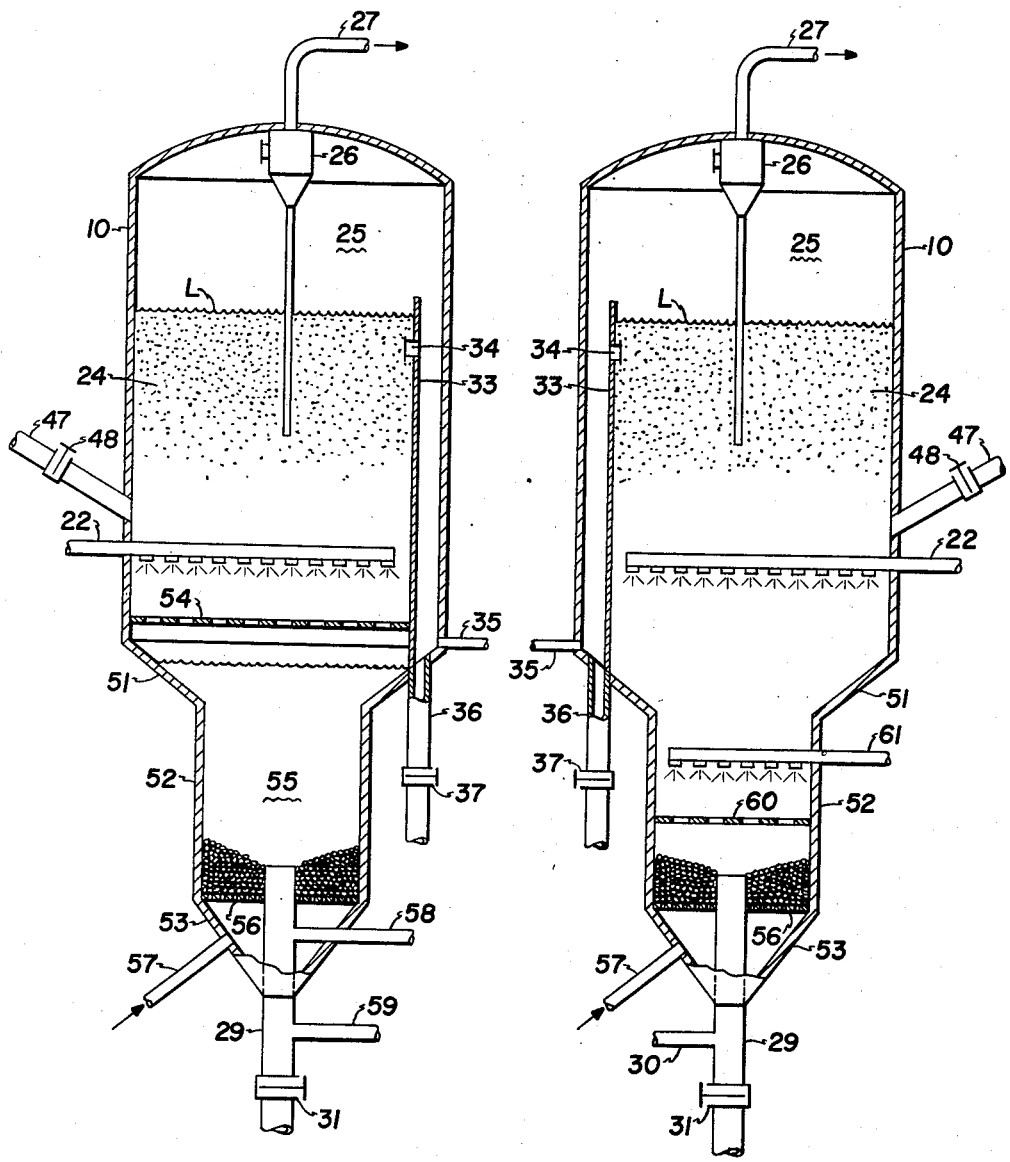

Reference is made to the accompanying drawing illustrating in Fig. 1 a diagrammatic flow plan of a reactor-regenerator system in which the reactor is provided with means for achieving good gas distribution in the region of high shot concentration in accordance with the present invention. Figs. 2 and 3 are vertical cross-sections of alternate forms of reactors containing means for providing good gas distribution in accordance with the present invention.

In Fig. 1 of the drawing, the reactor vessel 10 is charged with a mixture of finely divided catalyst particles and larger particles of inert heat transfer solids or shot. A shot concentrating or settling zone 11 of smaller cross-sectional area is arranged in the lower part of the reactor vessel. This settling zone may comprise a cylindrical sleeve member 12 arranged centrally of the main reactor vessel and spaced from the inner wall of the vessel by an annular screen or grid 13. Cylindrical member 12 is connected to the inverted cone member 14 which forms the wall of the settling or concentrating zone 11. Wall member 15 is the bottom of the reactor vessel proper and forms with the outer wall of cone member 14 and grid 13 a chamber 16 for the introduction of aeration gas, preferably recycle gas in a hydroforming process, which is supplied through inlet line 17. Additional aeration or recycle gas is supplied via inlet lines 18 and 19 to suitable distributor rings or spiders 20 and 21 inside the settling zone.

Naphtha feed, desirably in admixture with recycle gas is supplied in preheated condition to inlet line 22 to suitable distributor means 23 within the reactor. Gas velocities through the reactor are controlled to form a dense, fluidized bed 24 having a definite level L or interface separating it from a dilute or disperse phase 25 comprising small amounts of catalyst entrained in the vaporous reaction products in the upper part of the reactor vessel. The reaction products pass overhead from reactor vessel 10 through a cyclone separator 26 or the like for separating entrained catalyst and returning the same to the reactor dense bed 24 through the dip leg or pipe attached to the base of the separator. Reaction products substantially free from catalyst or other solid particles are removed through products outlet line 27 to suitable products recovery, stabilizing and storage equipment.

Suitable catalysts for charging to the system are metal oxides such as molybdenum oxide, chromium oxide, tungsten oxide, vanadium oxide, or the like or mixtures thereof, preferably upon an alumina-containing support such as activated alumina, alumina gel, zinc aluminate spinel or the like. Other hydroforming catalysts such as platinum, or palladium upon alumina can also be used. The catalyst particles should, for proper fluidization, be between about 200 to 400 mesh or about 10 to 200 microns in diameter with a major proportion between about 20 to 100 microns.

The inert heat transfer solids or shot are preferably coarser and/or of greater density than the catalyst used in the process. Suitable materials include particles of metals such as stainless steel and Monel, corundum, mullite, fused alumina, fused silica and the like. It is necessary that the heat transfer solids have no adverse effects upon the hydroforming process and that they be stable or resistant to breakdown due to the thermal and physical forces to which they are subjected in the process. The heat transfer solids or shot are preferably about 400 to 1400 microns in diameter or have an average diameter of about 1000 microns. The shot is preferably in the shape of spherical or spheroidal particles.

Because of the fact that the shot particles are larger and have a greater density than the catalyst particles, they settle more rapidly than the catalyst particles to the bottom of the reactor vessel 10. The recycle gas supplied through line 17 and grid 13 passes through the annular passageway surrounding cylindrical member 12 at a velocity sufficient to permit the accumulation of an essentially static bed 28 of shot particles. This bed of shot particles serves most effectively to distribute the recycle gas very uniformly into the lower part of the reactor vessel where the concentration of shot is very high. The bed of shot slants from the inner wall of the reactor vessel to the top of the cylindrical member 12. Shot settling through the reactor vessel pass directly into or deposit on the shot bed 28 and slide or roll off into the settling or concentrating zone 11. Additional recycle gas is supplied through inlet lines 18 and 19 to suitable distributor rings 20 and 21 in order to entrain any catalyst that may be carried down into settling zone 11 by the shot and return this catalyst to the main reactor bed 24. The shot-catalyst interface in zone 11 is maintained above distributor ring 20 and may extend above the top of sleeve 12. Preferably a baffle 54 is provided above the shot-catalyst interface in the main vessel. Shot substantially free of catalyst settles to the bottom of conical settling zone 11 into standpipe 29. Stripping or aeration gas may be supplied to standpipe 29 through inlet line 30 in order to strip off any occluded hydrocarbons and to facilitate the flow of the shot through flow control means or slide valve 31 into transfer line 32. Catalyst is withdrawn separately from the reactor vessel 10 by arranging a withdrawal well 33 having its upper, open end above the dense bed level L and having an opening or inlet port 34 suitably arranged near the upper part of the dense bed so that catalyst essentially free from shot may pass therethrough into the withdrawal well. Stripping gas such as steam or an inert gas such as scrubbed flue gas or nitrogen is introduced through inlet line 35 in order to strip out entrained or adsorbed vaporous reactants which are then discharged into the disperse phase 25 in the upper part of the reactor. Stripped catalyst passes from the bottom of the withdrawal well into a standpipe 36 and thence through a slide valve or other suitable flow control means 37 into transfer or riser line 32. Regeneration gas or air is supplied to line 32 to pick up catalyst discharged from standpipe 36 and shot discharged from standpipe 29 and carries the same into regenerator vessel 40. Line 32 extends up into regenerator 40 a distance above the draw-off point 46. A substantial depth of fluid bed must be maintained above the outlet of riser 32. A large portion of the regeneration air is required for transporting the solids and it is desirable to provide a sufficient holding time to assure complete burning of the carbon from the catalyst. Additional regeneration gas or air may be supplied directly to the regenerator vessel as through inlet line 41 to suitable distributing means in order to supply such additional air as may be needed to complete the regeneration and fluidize the bottom of the regeneration vessel. The velocity of the regeneration gas or air through the regenerator vessel 40 is at such a rate as to form a dense, fluidized bed 42 of catalyst and shot particles in regeneration gas having a definite level $L^1$. A dilute or disperse phase comprising small amounts of finely divided solid particles entrained in regeneration gases is formed at 43 in the upper part of the regenerator vessel above the dense bed level $L^1$. The regeneration gases are withdrawn from the regenerator vessel 40 through a cyclone separator 44 or the like, and the gases, substantially free of catalyst or solid particles pass overhead through outlet line 45 through suitable pressure relief or turbine means and thence to a waste heat boiler or waste gas stack or to suitable scrubbing and storage equipment in the event that it is desired to utilize the gas for stripping or as a carrier gas. Shot and catalyst pass from bed 42 into withdrawal well 46 at the bottom of the vessel and thence into transfer line 47 provided with flow control means 48 which discharges the mixture back into the dense bed 24 in reactor 10. If desired, stripping gas such as steam, scrubbed flue gas or the like may be supplied to the transfer line 47 and/or to withdrawal well 46 to remove residual or entrained regeneration gas. Moreover in the case of hydroforming catalysts of the group VI metal oxide type, the regenerated catalyst may be treated in transfer line 47 with a reducing gas such as hydrogen or a hydrogen-rich recycle gas or it may be discharged directly into the reactor 10 without contact with reducing gases.

Figs. 2 and 3 show alternative forms of reactor vessels with shot concentrating or settling sections. In these figures the corresponding parts carry the same reference numerals as in Fig. 1. In Figs. 2 and 3, the bottom of the reactor vessel comprises a frustoconical section 51 which is connected to a cylindrical settling or shot concentration section 52 which is closed at the bottom with a conical section 53 through which the standpipe 29 passes.

In Fig. 2, a baffle 54 is arranged below the naphtha feed distributor in order to facilitate separation of shot from catalyst as described above. This baffle may comprise a 25–50% free area pierced plate, a 6–12 inch deep egg-crate type vertical baffle or similar devices. With these types of baffles the recycle gas supplied below can pass through the baffle carrying finely divided catalyst upwardly with it and without substantially interfering with the passage of the shot through the openings into the shot concentrating section 55. An annular screen 56 surrounds the upper part of the standpipe 29 and serves to support a bed of very coarse shot or other solids which serves to even out the distribution of the recycle gas which is supplied through inlet line 57. Substantially pure shot enters the upper end of standpipe 29 and is stripped by the addition of any suitable stripping gas supplied through inlet lines 58 and 59.

Fig. 3 is similar to Fig. 2 but differs by having the pierced plate baffle 60 arranged in the lower part of settling zone 52 and below inlet line 61 and suitable distributing means for the main stream of recycle gas. A small amount of recycle gas, generally less than 35–50% of the total gas to zone 52 is supplied through inlet line 57 and passes through screen or grid 56 on which shot accumulates to even out the gas distribution. The openings in the pierced plate are kept as small as possible without unduly interfering with total solids circulation or passage. Free area of the pierced plate baffles 60 may be as low as 35% but it is generally preferable to have a free area of at least about 50%. While as indicated above the major proportion of the recycle gas is supplied through line 61 and a minor proportion through inlet 57 this is for normal operation. When an upset occurs, particularly if catalyst gets below pierced plate baffle 60 and interferes with circulation, gas supply to inlet line 61 is cut off and all, or most, of the gas is supplied to inlet line 57 until the catalyst is removed whereupon the normal flow pattern may be resumed.

The feed or charging stock to the reactor in a hydroforming operation may be a virgin, cracked (thermal or catalytic) or Fischer-Tropsch naphtha, or the like or mixtures of two or more of these naphthas having a boiling range of from about 125–450° F., or it may be a narrow boiling cut from within this range. The feed stock is preheated to reaction temperature generally about 1000° F. and supplied to the reaction zone. Recycle gas is preheated to temperatures of up to about 1000° F. and introduced or circulated through the reaction zone at rates of from about 500 to 6000 cu. ft. per barrel of naphtha feed. Because the naphtha feed and recycle gas are preheated to the same temperatures, this invention permits combining the feed and recycle streams thereby saving on furnace and heat exchange investment.

The hydroforming reactor vessel is operated at about 850–1050° F., preferably about 900–950° F., and at pressures of about 50–1000, preferably about 200 lbs. per sq. inch. In the case of molybdenum oxide on alumina catalysts it is desirable to maintain a water partial pressure of about 0.1 to 3.0 mol percent in the reaction zone.

The regenerator is operated at essentially the same pressure as the hydroformer reactor vessel and at temperatures of about 1000–1200° F. or low enough to avoid thermal degradation of the catalyst. The average residence time of the catalyst in the reactor vessel is of the order of from about 1 to 4 hours and in the regenerator vessel of from about 3 to 60 minutes. The average residence time of the heat transfer solids in the reaction zone is of the order of about 3 to 20 minutes and in the regeneration zone the residence time of the heat transfer solids may be coextensive with that of the catalyst or said solids may be held for longer or shorter times than the catalyst.

The weight ratio of catalyst to oil introduced into the reactor should ordinarily be about 0.5 to 3.5. Space velocities, or the weight in pounds of feed charged per hour per pound of catalyst in the reactor depends upon the age and activity level of the catalyst, the character of the feed stock and desired octane number of the product. Space velocity for a molybdic oxide on alumina gel catalyst may vary from about 1.5 to about 0.15 w./hr./w.

A typical operation in accordance with this invention is as follows: A 250–325° F. West Texas virgin naphtha is hydroformed to 92 Research (clear) O.N. Reactor temperature is 900° F., pressure 200 p.s.i.g., and space velocity is 0.78 pound of oil per hour per pound of catalyst in the reactor. The catalyst comprises 10 wt. percent molybdic oxide supported on an activated alumina support stabilized by the inclusion of 2.0 wt. percent silica therein. The shot used are mullite spheroids having an average diameter of 1000 microns. Approximately 800 s.c.f./b. of recycle gas are added to the shot stripping zone at the reactor bottom to separate a pure shot bed or stream. An additional 1200 s.c.f./b. of recycle gas is mixed with the naphtha feed, heated to 1000° F. and fed to the reaction zone. Catalyst is circulated to the regenerator and thence to the reactor at a catalyst to oil ratio of 0.72. Shot is circulated at a shot to oil ratio of 2.5 or a shot to catalyst ratio of 3.5. The regenerator temperature is maintained at 1125° F. Catalyst holding time in the regenerator is about 5 minutes with 0.5 to 1.0 vol. percent oxygen in the flue gas. Catalyst holding time in the reactor is 1.8 hours.

The foregoing description contains a limited number of embodiments of this invention. It will be understood that this invention is not limited thereto since numerous variations are possible without departing from the scope of this invention.

What is claimed is:

1. In a methed of hydroforming hydrocarbon fractions boiling within the motor fuel boiling range in contact with a mixture of a major proportion of finely divided catalyst particles and a minor proportion of inert, heat transfer solids or shot in a dense, fluidized bed and in which catalyst and shot are continuously withdrawn from the reaction zone and circulated to a regeneration zone where carbonaceous deposits are burned off and the catalyst and shot are heated for return to the reaction zone the improvement which comprises controlling vapor velocities through the reactor dense bed so that shot particles settle to the bottom of the reactor vessel more rapidly than catalyst, passing a portion of the hydrogen recycle gas into a zone of high shot concentration at the bottom of the reactor vessel through a substantially stationary annular bed of shot, discharging shot substantially free from catalyst into a concentrating zone, contacting the shot in said concentrating zone with further quantities of recycle gas to remove any residual catalyst particles, separately withdrawing a stream consisting essentially of catalyst from the upper part of the dense, fluid reactor bed, discharging the withdrawn catalyst and shot in the desired ratio into a transfer line, conveying the resultant mixture into a separate regeneration zone where carbonaceous deposits are burned off and the catalyst and shot are heated and recycling the heated catalyst and shot to the reaction zone.

2. The method as defined in claim 1 in which the mixture of catalyst and shot is discharged into a dense fluidized bed in the regeneration zone and regenerated catalyst and heated shot are withdrawn from the bottom of the regenerator dense bed for recycling to the reaction zone.

3. A reactor vessel for contacting vaporous reactants with a mixture of finely divided catalyst particles and larger particles of solid, heat exchange material or shot which comprises a vertical, cylindrical vessel, a conical bottom on said vessel, a conical withdrawal well arranged centrally of the vessel at the bottom thereof, a perforated annular grid arranged between said conical withdrawal well and the internal wall of the vessel, means for supplying gas beneath said perforated annular grid, means for supplying gas to at least one part of the interior of said conical withdrawal well, inlet and distributor means for supplying vaporous reactants to said vessel above said conical withdrawal well, a withdrawal well for the removal of finely divided catalyst with its inlet arranged in the upper part of the reactor vessel and means for the withdrawal of vaporous reaction products overhead from said reactor vessel.

4. A reactor vessel for contacting vaporous reactants with a mixture of finely-divided catalyst particles and larger particles of solid heat exchange material or shot which comprises a vertical, cylindrical vessel, a withdrawal well for the removal of shot arranged at the bottom of the reactor vessel and of smaller diameter than the vessel, means for supplying gaseous material to the said withdrawal well to separate entrained catalyst from the shot passing through said withdrawal well, inlet and distributor means for supplying vaporous reactants to the lower part of said vessel above said withdrawal well for the removal of shot, a withdrawal well for the removal of finely divided catalyst with its inlet arranged in the upper part of the reactor vessel and a pierced plate baffle having a free area greater than 35% arranged horizontally within the reactor vessel between said inlet and distributor means and said withdrawal well for the removal of shot to facilitate the separation of shot and catalyst by permitting the gaseous material supplied therebelow to pass upwardly through the baffle carrying finely divided catalyst with it without substantially interfering with the passage of shot downwardly through the openings into the withdrawal well for the removal of shot.

References Cited in the file of this patent

UNITED STATES PATENTS

| 2,427,341 | Alther | Sept. 16, 1947 |
| 2,446,247 | Scheineman | Aug. 3, 1948 |
| 2,455,915 | Borcherding | Dec. 14, 1948 |
| 2,461,584 | Andersen et al. | Feb. 15, 1949 |
| 2,487,961 | Angell | Nov. 15, 1949 |
| 2,550,922 | Gullette | May 1, 1951 |
| 2,557,680 | O'Dell | June 19, 1951 |
| 2,631,921 | O'Dell | Mar. 17, 1953 |
| 2,707,702 | Watson | May 13, 1955 |
| 2,721,167 | Nicholson | Oct. 18, 1955 |
| 2,733,193 | Haensel | Jan. 31, 1956 |
| 2,763,596 | Feldbauer et al. | Sept. 18, 1956 |